(12) United States Patent
Sherkin

(10) Patent No.: US 9,760,704 B2
(45) Date of Patent: Sep. 12, 2017

(54) SECURITY APPARATUS SESSION SHARING

(71) Applicant: BlackBerry Limited, Waterloo (CA)

(72) Inventor: Alexander Sherkin, Vaughan (CA)

(73) Assignee: BlackBerry Limited, Waterloo, Ontario (CA)

( * ) Notice: Subject to any disclaimer, the term of this patent is extended or adjusted under 35 U.S.C. 154(b) by 1 day.

(21) Appl. No.: 14/286,766

(22) Filed: May 23, 2014

(65) Prior Publication Data

US 2015/0339473 A1    Nov. 26, 2015

(51) Int. Cl.
*H04L 9/00* (2006.01)
*G06F 21/34* (2013.01)
*G06F 21/44* (2013.01)

(52) U.S. Cl.
CPC .............. *G06F 21/34* (2013.01); *G06F 21/44* (2013.01)

(58) Field of Classification Search
CPC .......... G06F 21/34; G06F 21/44; G06F 21/41; H04L 63/815
See application file for complete search history.

(56) References Cited

U.S. PATENT DOCUMENTS

| | | | | |
|---|---|---|---|---|
| 7,802,293 B2* | 9/2010 | Boyer et al. | | 726/6 |
| 8,423,651 B1* | 4/2013 | Grieve | | G06F 9/54 709/203 |
| 8,438,289 B1* | 5/2013 | Grieve | | G06F 9/54 709/203 |
| 8,856,887 B2* | 10/2014 | Field-Eliot et al. | | 726/4 |
| 8,868,915 B2* | 10/2014 | Counterman | | G06F 21/335 713/176 |
| 8,990,917 B2* | 3/2015 | Cai | | H04L 63/0245 726/11 |
| 8,997,189 B2* | 3/2015 | Lester | | G06F 21/31 713/152 |
| 9,047,393 B1* | 6/2015 | Grieve | | G06F 9/54 |
| 9,064,105 B2* | 6/2015 | Hosoda | | |
| 9,088,564 B1* | 7/2015 | Hobson | | H04L 63/083 |
| 9,112,854 B1* | 8/2015 | Bhimanaik | | H04L 63/0823 |

(Continued)

FOREIGN PATENT DOCUMENTS

EP    2670105 A1    12/2013

OTHER PUBLICATIONS

European Extended Search Report; Application No. 15166645.0; Oct. 6, 2015; 7 pages.

*Primary Examiner* — Sharon Lynch
(74) *Attorney, Agent, or Firm* — Conley Rose, P.C.; J. Robert Brown, Jr.; Albert A. Abbou

(57) ABSTRACT

An electronic device includes multiple applications that can access a smart card or other security apparatus. A first application that is to use the security apparatus prompts a user for a security string such as a PIN or password. Upon receipt of the PIN or password, the first application unlocks the security apparatus for use. Additionally, the first application receives a token from a security service that interfaces with the security apparatus. The token can be shared by the first application with other applications. For example, the first application can share the token with other trusted applications. The other applications that receive the token can refrain from issuing a prompt for a security string and receiving a response from the user. The token can be used instead of the security string to obtain access to the security apparatus.

21 Claims, 7 Drawing Sheets

(56) References Cited

U.S. PATENT DOCUMENTS

| | | | |
|---|---|---|---|
| 2001/0045451 A1* | 11/2001 | Tan et al. .................. 235/375 |
| 2001/0054148 A1* | 12/2001 | Hoornaert et al. .......... 713/172 |
| 2002/0029343 A1* | 3/2002 | Kurita ........................ 713/185 |
| 2003/0012382 A1* | 1/2003 | Ferchichi .............. H04L 63/062 380/270 |
| 2004/0034774 A1* | 2/2004 | Le Saint .................... 713/169 |
| 2005/0138421 A1* | 6/2005 | Fedronic et al. ........... 713/201 |
| 2006/0013393 A1* | 1/2006 | Ferchichi .............. H04L 63/062 380/247 |
| 2006/0230437 A1* | 10/2006 | Alexander Boyer ........................ G06F 21/6245 726/4 |
| 2007/0277032 A1* | 11/2007 | Relyea ....................... 713/159 |
| 2007/0297615 A1* | 12/2007 | Clarke et al. .............. 380/286 |
| 2008/0022379 A1* | 1/2008 | Wray ............................. 726/6 |
| 2008/0034216 A1* | 2/2008 | Law ............................. 713/183 |
| 2008/0077803 A1* | 3/2008 | Leach et al. ............... 713/189 |
| 2009/0210942 A1* | 8/2009 | Abel ............................. 726/20 |
| 2009/0217367 A1* | 8/2009 | Norman et al. ............... 726/8 |
| 2010/0077469 A1* | 3/2010 | Furman .................. G06F 21/41 726/8 |
| 2010/0146611 A1* | 6/2010 | Kuzin ................. H04L 63/0815 726/8 |
| 2010/0313027 A1* | 12/2010 | Taylor ........................ 713/172 |
| 2011/0092185 A1* | 4/2011 | Garskof ................ G06F 21/35 455/411 |
| 2011/0296515 A1* | 12/2011 | Krstic .................. H04L 9/3213 726/10 |
| 2012/0173610 A1* | 7/2012 | Bleau ..................... H04L 67/26 709/203 |
| 2012/0291114 A1* | 11/2012 | Poliashenko et al. .......... 726/8 |
| 2013/0054336 A1* | 2/2013 | Graylin ................... 705/14.26 |
| 2013/0086669 A1* | 4/2013 | Sondhi ................... G06F 21/41 726/8 |
| 2013/0097660 A1* | 4/2013 | Das ........................ H04L 63/10 726/1 |
| 2013/0227279 A1* | 8/2013 | Quinlan .............. H04L 63/0428 713/165 |
| 2013/0332723 A1* | 12/2013 | Tan et al. .................... 713/150 |
| 2014/0013396 A1* | 1/2014 | Field-Eliot .......... H04L 63/0807 726/4 |
| 2014/0047528 A1* | 2/2014 | Schmidt ............... H04L 63/061 726/7 |
| 2014/0068779 A1* | 3/2014 | Tan ....................... G06F 21/606 726/26 |
| 2014/0075513 A1* | 3/2014 | Trammel et al. ................ 726/4 |
| 2014/0082715 A1* | 3/2014 | Grajek ............... H04L 63/0815 726/8 |
| 2014/0095874 A1* | 4/2014 | Desai ................. H04L 63/0815 713/168 |
| 2014/0164541 A1* | 6/2014 | Marcellino ............. H04L 51/24 709/206 |
| 2014/0281548 A1* | 9/2014 | Boyer .................... H04L 63/061 713/171 |
| 2014/0298420 A1* | 10/2014 | Barton .................... H04L 63/10 726/4 |
| 2014/0337528 A1* | 11/2014 | Barton .................... H04L 63/10 709/225 |
| 2015/0012995 A1* | 1/2015 | Korat .................... H04W 12/06 726/8 |
| 2015/0058213 A1* | 2/2015 | Lee Kim-Koon . G06Q 20/3278 705/41 |
| 2015/0067062 A1* | 3/2015 | Bleau .................... H04L 67/26 709/204 |
| 2015/0089618 A1* | 3/2015 | Ferchichi .............. H04L 63/062 726/8 |
| 2015/0150111 A1* | 5/2015 | Friedmann .......... H04L 63/0815 726/9 |
| 2015/0180858 A1* | 6/2015 | Shanmugam ....... H04L 63/0815 726/8 |

* cited by examiner

SECURITY APPARATUS SESSION SHARING

BACKGROUND

Embodiments of the subject matter generally relate to the field of electronic devices, and, more particularly, to sharing a security apparatus by applications executing on an electronic device.

Many applications on electronic devices such as smart phones, personal computers, laptop computers, tablet computer etc. are used to access networks, communications, personal information, financial information, or other information that a user may consider sensitive. One way of preventing unauthorized access to such networks, communications, or sensitive information is to require a user to enter a security string such as a personal identification number (PIN) or password before access is granted.

While the use of PINs and passwords can be a useful mechanism in preventing unauthorized access to applications, services or data, users can grow frustrated with the repeated requirements to enter a PIN or password with each invocation of an application.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences and computer program products that embody techniques of the present subject matter. However, the described embodiments may be practiced without these specific details. For instance, although examples refer to smart cards, any type of security apparatus may be used. In other instances, well-known instruction instances, protocols, structures and techniques have not been shown in detail in order not to obfuscate the description.

According to features of the disclosure, an electronic device may include multiple applications that can access a security apparatus, such as, for example a smart card. A first application that is to use the security apparatus may prompt a user for a security string such as, for example, a PIN or password. Upon receipt of the PIN or password, the first application may unlock the security apparatus for use by the first application. Additionally, the first application may receive a token from the security apparatus or from a security service that interfaces with the security apparatus. The token can be shared by the first application with other applications. For example, the first application can share the token with other trusted applications. For example, applications from the same application provider may be considered trusted applications. Alternatively, applications that form part of a software suite may be considered trusted applications. In general, a group of applications may be referred to as trusted application is they share a common security policy. The other applications that receive the token can refrain from issuing a prompt for a security string and receiving a response from the user. The token can be used instead of the security string to obtain access to the security apparatus. In one embodiment, the token may have an expiration date or time, and may be invalidated at the expiration date or time, upon closing the session, or upon a power reset of the electronic device or security apparatus.

Figure 1:
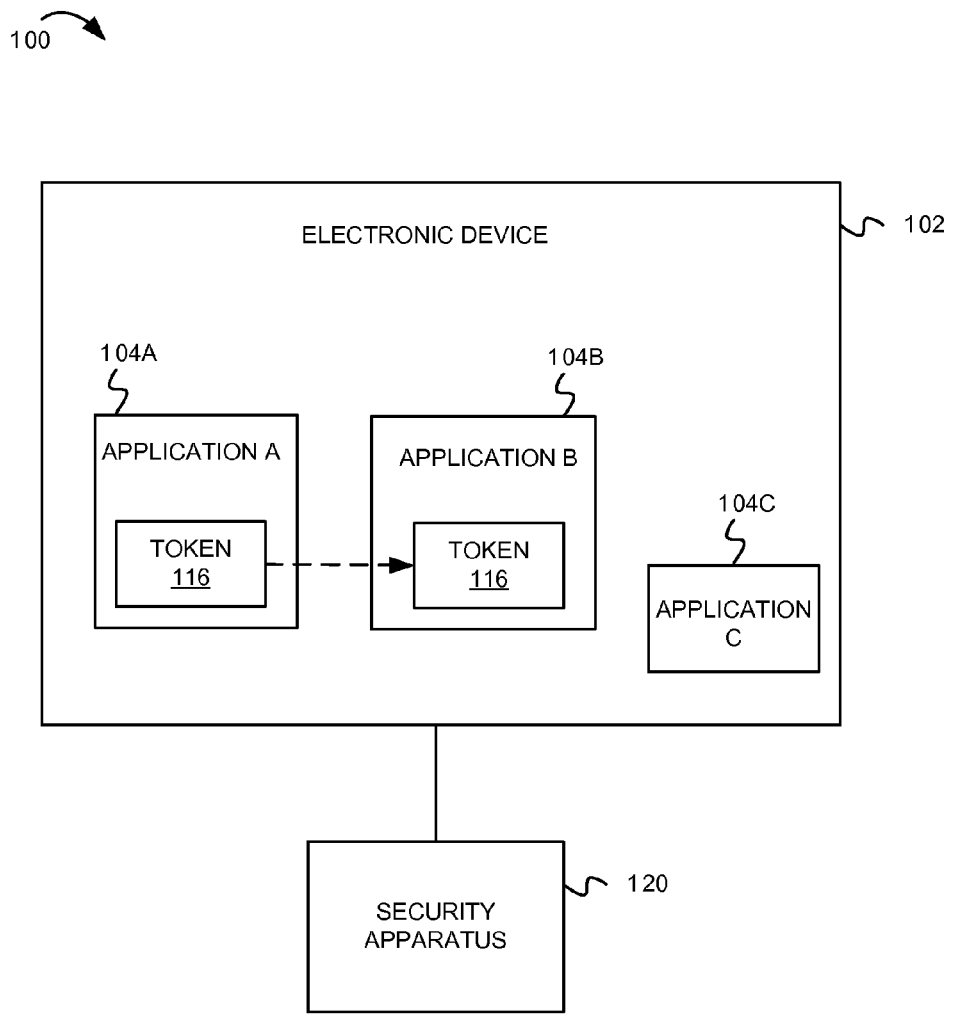
FIG. 1 is a block diagram illustrating a system for sharing a security apparatus according to embodiments of this disclosure.

FIG. 1 is a block diagram illustrating a system 100 for sharing a security apparatus. System 100 includes an electronic device 102 and a security apparatus 120. Electronic device 102 can be any type of electronic device, such as a mobile communications device. For example, an electronic device 102 can be a smart phone, mobile phone, personal computer, laptop computer, tablet computer, media player, set top box, game console, electronic book reader etc. The embodiments are not limited to any particular type of electronic device.

Electronic device 102 can be coupled to the security apparatus 120. In some embodiments, the security apparatus 120 can be a smart card. A smart card can be a small (e.g., pocket sized or smaller) portable card with embedded logic that can provide identification, authorization, authentication, cryptographic, signing and/or other functions. Security apparatus 120 may include a processor and/or memory (not shown). Electronic device 102 can be coupled to the security apparatus 120 in a variety of ways. For example, the security apparatus 120 can be a smart card that is inserted into a smart card reader (not shown) coupled to the electronic device 102. The smart card may communicate with the smart card reader, for example, via electrical or optical contacts or via wireless communications mechanisms. Alternatively, the security apparatus 120 can be coupled to the electronic device 102 via a port of the device 102 such as, for example, a SIM (Subscriber Identity Module) port or USB port on the electronic device 102. Further, the security apparatus 120 can be a system on a chip or other logic that is coupled to circuitry of the electronic device 102.

Various applications (e.g., applications 104A, 104B and 104C, referred to generally as application 104) can execute on the electronic device 102. An application 104 is an application or service that utilizes security functions provided by the security apparatus 120 and can therefore referred to as a client of the security apparatus 120. However, while an application may be a client from the point of view of the security apparatus 120, the application may provide a service to other respective clients of the application. Thus an application 104 can be both a client and a service. Application 104 can be a secure email client or service such as S/MIME (Secure/Multipurpose Internet Mail Extensions), a VPN (Virtual Private Network) service, a WiFi service, a secure voice service, a browser or other application using a secure protocol such as HTTPS (Hypertext Transfer Protocol Secure), or any other program or set of programs that can utilize a security function provided by security apparatus 120. In the example shown in FIG. 1, three applications (i.e., applications 104A-104C) are shown as executing on electronic device 102. It will be appreciated that an electronic device 102 may have more or fewer applications that can utilized the security apparatus 120.

In some embodiments, before the security apparatus 120 can be utilized by an application 104, the security apparatus is unlocked. In order to unlock the security apparatus 120, a security string such as a PIN or password associated with the security apparatus 120 is provided to the security apparatus 120 by an application 104. The security string may be obtained from a user by prompting the user to enter the security string. In the example illustrated in FIG. 1, assume application 104A provides the security string. Upon unlocking the security apparatus 120, the application 104A is issued a token 116. The token 116 can, for example, be a randomly generated secret key. In some embodiments, the token may be a 256 bit key that is generated by a secure pseudo random number generator (PRNG). Other key lengths may be used depending on the desired security and encryption/decryption performance. The token may be generated by the secure apparatus 120 or by a component of electronic device 102, for example a security apparatus support component (e.g., service, driver etc.). The token 116 may be provided to the security apparatus 120 to indicate that the application possessing a copy of the token is authorized to utilize the security apparatus 120. Token 116 may include other data describing the token. For example, token 116 may include data specifying an expiration date or time.

An application receiving the token 116 may share the token with other applications. For instance, in the example illustrated in FIG. 1, application 104A shares the token 116 with application 104B, but does not share the token with application 104C. Thus application 104B may utilize the functions and services provided by security apparatus 120 without providing a security string, thereby eliminating the need for application 104B to prompt a user to enter a security string. In the example illustrated in FIG. 1, application 104C does not possess a copy of the token 116, and thus may prompt the user to enter the correct security string before being allowed to use the functions and services provided by security apparatus 120.

Further details on the operation of the above-described system will be provided below with respect to FIG. 2.

Figure 2:
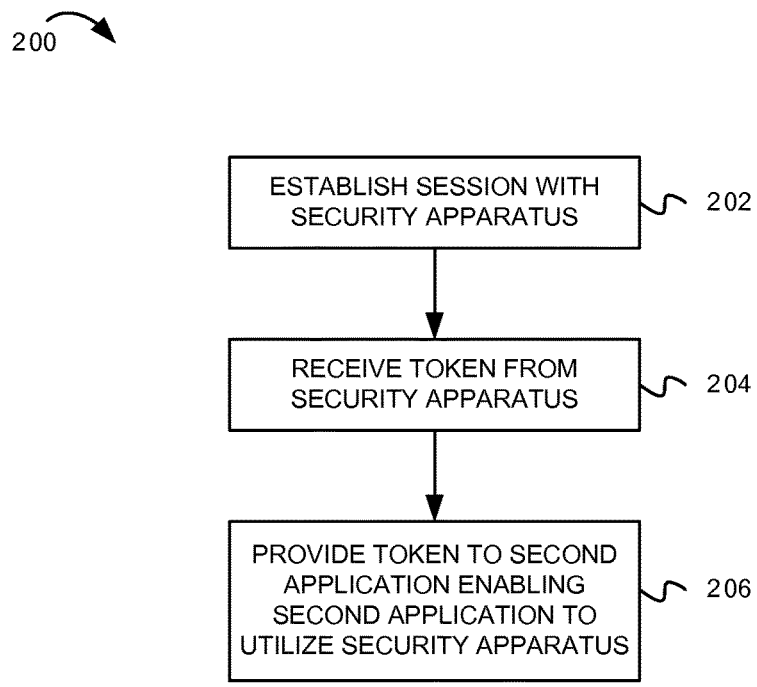
FIG. 2 is a flowchart illustrating operations for sharing a security apparatus according to embodiments of this disclosure.

FIG. 2 is a flowchart 200 illustrating operations for sharing a security apparatus according to embodiments. In some embodiments, the operations begin at block 202 by establishing a session with a security apparatus 120. For example, an application (e.g., application 104A) can prompt a user for a security string such as a PIN or password, and supply the security string to the security apparatus to unlock the functions, services and data provided on the security apparatus 120. A session can be a time period during which the security apparatus 120 is unlocked and available for use. The security apparatus 120 can become locked, thereby ending a session, for example, as a result of a power reset on the security apparatus 120 or electronic device 102, a timeout, or an explicit instruction to lock the security apparatus 120. A token for the session may be invalidated when the security apparatus becomes locked.

At block 204, the application receives a token in response to unlocking the security apparatus 120. The token can be generated and provided, for example, by the security apparatus 120, or the token can be generated by another unit of an electronic device.

At block 206, the application unlocking the security apparatus provides the token to one or more other applications. Thus the token can be shared by multiple applications. The applications that possess a valid token can utilize the functions and services provided by the unlocked security apparatus. The applications that receive the token from the application that unlocked the security apparatus 120 do not issue a prompt for a security string, instead, they can use the token to access the security apparatus.

The token may be provided from one application to other applications in different ways. For example, in some embodiments, the token can be shared through a file system on electronic device 102 that is accessible to the applications that are to share the token. In other embodiments, the token can be passed from one application to another application using interprocess communication functions provided by an operating system executing on electronic device 102. In still other embodiments, the token can be passed using a shared memory segment that is shared between the applications that are to share the token. Those of skill in the art will recognize that there may be other ways that the token may be provided from one application to another.

Further features of various embodiments are described below with reference to FIGS. 3-6.

Figure 3:
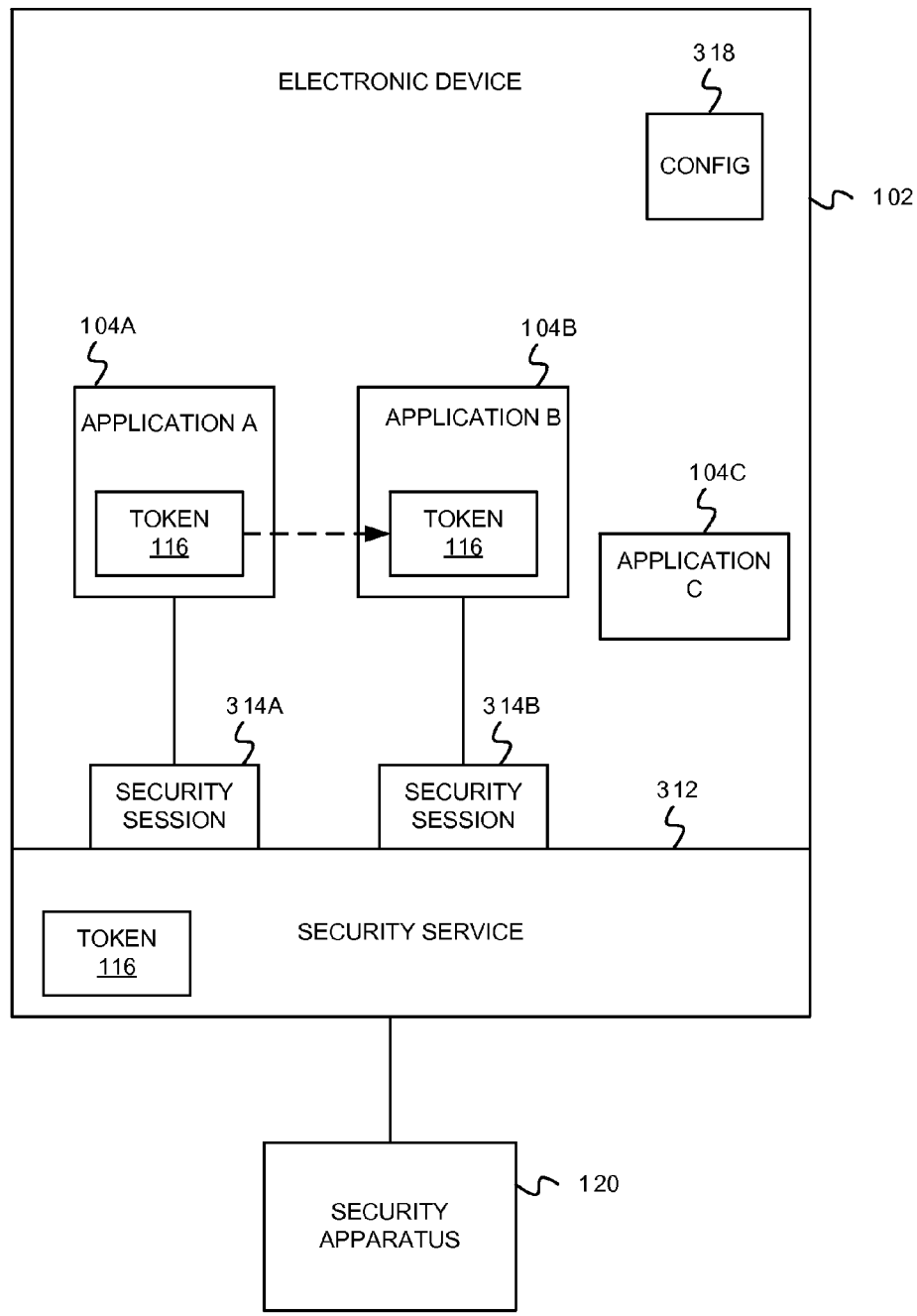
FIG. 3 is a block diagram illustrating a system for sharing a security apparatus through a security service according to embodiments of this disclosure.

FIG. 3 is a block diagram illustrating a system 300 for sharing a security device through a security service according to embodiments. In addition to the aspects of system 100 described above, system 300 includes a security service 312. Security service 312 provides an interface between an application 104 and the security apparatus 120. For example, security service 312 can include a device driver that provides a software interface to the hardware of security apparatus 120, and can provide an application program interface (API) that provides a software interface that an application 104 uses to access the functions, services and data on security apparatus 120. In addition, security service 312 can provide session management functions for managing sessions 314A and 314B that are established between applications 104A and 104B respectively.

Application 104A can establish a session 314A by unlocking the security apparatus 120 using an API function provided by the security service 312. Application 104A may prompt a user for a security string, which upon receipt, can be provided to the security apparatus 120 through an API function provided by the security service 312.

Security apparatus 120 validates the security string. If a valid security string has been supplied, then security apparatus 120 can enter an unlocked state. In some embodiments, security apparatus 120 can generate the token 116 that can be provided to the application 104A. In alternative embodiments, security apparatus 120 can indicate to the security service 312 that the security string provided by the application 104A is a valid security string and thus the application 104A is allowed to access the security apparatus 120. In response to the indication, the security service 312 can establish session 314A and generate the token 116 that is provided to the application 104A.

Application 104A can share the token 116 with other applications, for example, application 104B. As noted above, the token may be shared using a file system, shared memory, or other interprocess communication technique. Application 104B can request a session be established by providing the token 116 to the security service 312. In some embodiments, the security service 312 can validate the token to determine if the token is valid or invalid. In alternative embodiments, the security service 312 can pass the token 116 to security apparatus 120. Security apparatus 120 can provide an indication to the security service 312 as to whether the token is valid or invalid.

In response to receiving a valid token from application 104B, the security service 312 can establish session 314B, thereby providing application 104B with access to security apparatus 120. Application 104B can thus refrain from issuing a prompt for a security string and receiving a response from the user. In some embodiments, security service 312 controls access to security apparatus 120 such that an application desiring to utilize functions, services or data provided in the security apparatus 120 utilize the security service 312 and are prevented from bypassing the security service 312. In particular embodiments, access control permissions can be used to limit access to the security apparatus 120 to security service 312. Thus applications that do not have a valid token can be prevented from accessing security apparatus 120 without receiving a security string, for example, from a user of the device 102.

In some embodiments, configuration 318 may include data specifying the applications that can share a token 116. For example, configuration 318 may specify a white list of applications that are allowed to share the token 116. Alternatively, configuration 318 may specify a black list of applications that are not allowed to receive the token 116. Further, configuration 318 may include both a white list and a black list. Security service 312 can use the configuration 318 to determine which applications 104 are provided access to security apparatus 120. The white list and black list may specify applications by name or other identifier (e.g., a GUID (globally unique identifier)) that are allowed (white list)/not allowed (black list) to share a token. In some embodiments, the white list and the black list can specify relationships between applications that are allowed or not allowed to share a token. For example, the white list and/or the black list can include data specifying a domain such that applications in the same domain are allowed to share (white list) or not share the token (black list).

In some embodiments, a user of electronic device 102A may specify the white list and/or black list. In alternative embodiments, an administrator (e.g., an enterprise or corporate security/IT department) may specify the white list and/or black list. The white list and/or black list can be sent to electronic device 102 by a corporate server, enterprise server or other server. Alternatively, the white list and/or black list may be retrieved from a corporate server, enterprise server, or other server by electronic device 102. In one example, a white list and/or black list can be applied globally to many or all applications 104 on the electronic device 102.

In the example illustrated in FIG. 3, application 104C does not possess the token 116 and has not established a security session with the security service 312. Thus application 104C is not allowed to access the functions, services and data provided by the security apparatus 120 without receiving a security string, for example, from a user of the device 102. Application 104C can acquire access to the security apparatus 120 by prompting the user to enter a security string and providing the security string to the security apparatus 120 via security service 312. Alternatively, Application 104C can request that application 104A share the token 116. Application 104A can determine if the token can be shared with application 104C. For example, application 104A may consult configuration 318 to determine if the token 116 can be shared. If the application 104A determines that the token can be shared, then application 104A can share the token using a file system, shared memory or interprocess communication function.

As an example, application 104A can be can be a VPN (Virtual Private Network) service that establishes a secure network tunnel to a corporate network over a public network, and application 104B can be an email client or service such as S/MIME (Secure/Multipurpose Internet Mail Extensions) that communicates with an email server on the corporate network. Both applications can be used to access corporate or enterprise network assets and thus be part of a common security scheme or policy. Therefore applications 104A and 104B can be considered trusted applications with respect to one another. Application 104C may be a game application that is downloaded by a user to the electronic device 102. The application 104C may not be trusted in this example because the game application does not share a common security scheme or policy with the email application and the VPN service.

Figure 4:
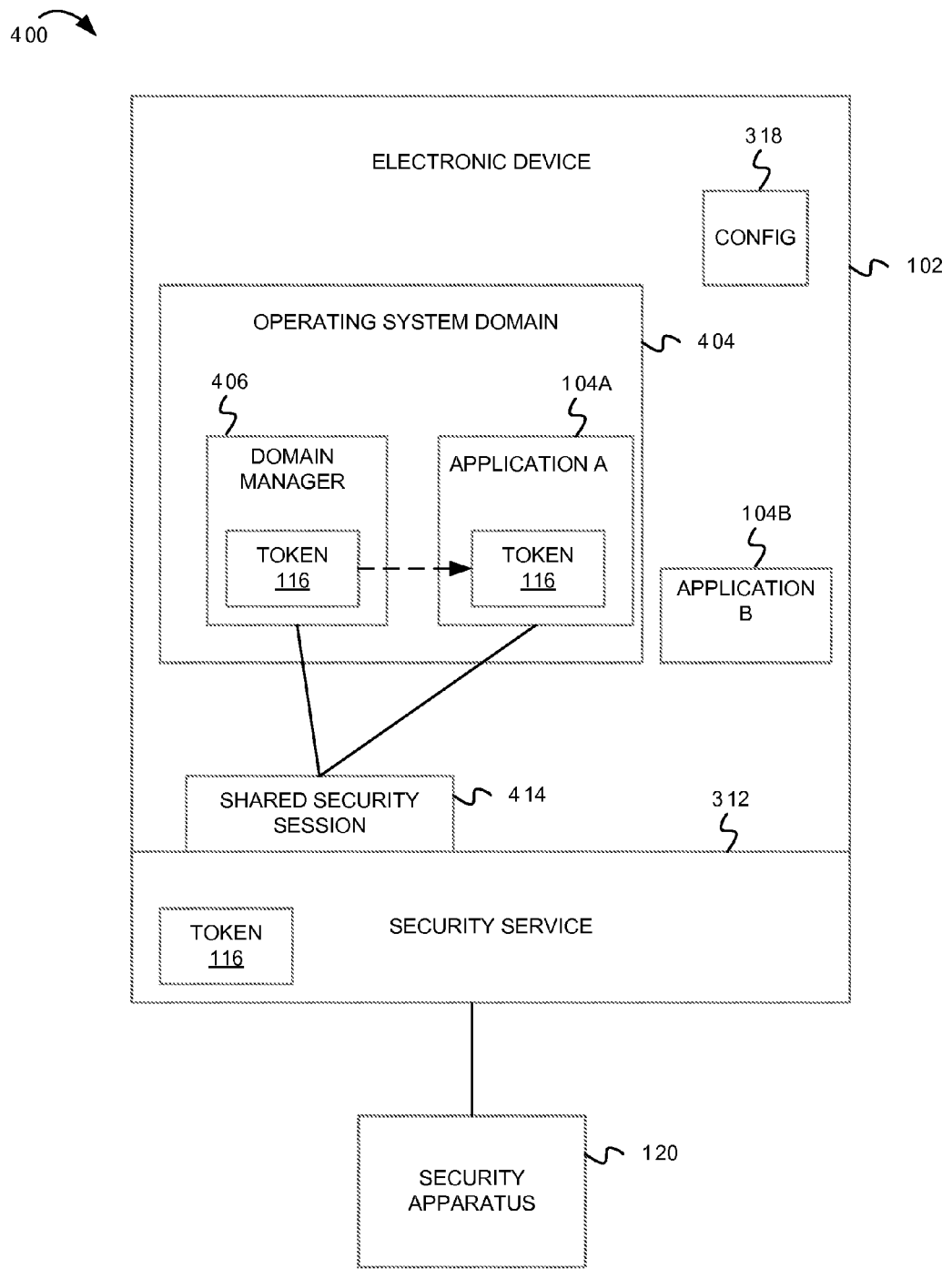
FIG. 4 is a block diagram illustrating a system for sharing a security apparatus between applications in an operating system domain according to embodiments of this disclosure.

FIG. 4 is a block diagram illustrating a system 400 for sharing a security device between applications in an operating system domain according to embodiments. In addition to the aspects of system 100 and system 300 described above, system 400 includes an operating system domain 404, a domain manager 406, and a shared security session 414. An operating system domain 404 comprises a logical partitioning of resources on electronic device 102. Such resource can include one or more of applications, data, network access, file systems and other resources on electronic device 102. Policies and configurations may be used to define the logical partitioning. An operating system domain may define which applications are allowed to access the resources allocated to an operating system domain. For example, applications within a domain may be allowed to access the resources allocated to the operating system domain 404 and prevented from using resources that are not allocated to the operating system domain 404. Similarly, applications outside of operating system domain 404 may be prevented from accessing resources allocated to operating system domain 404. A domain may also be referred to as a security perimeter, application suite, security partition, or other terms to denote a separation of resources within the electronic device. While system 400 depicts one such operating system domain 404, an electronic device 102 could include any number of such domains.

Domain manager 406 manages the resources allocated to the operating system domain 404. Domain manager 406 can be considered an application of the device 102. Domain manager 406 can be a client of security service 312 and security apparatus 120. In some embodiments, domain manager 406 prompts a user of electronic device 102 for a security string. Upon receipt of the security string, domain manager 406 provides the security string to security apparatus 120 via security service 312. The security apparatus 120 validates the security string, and if valid, unlocks the security apparatus 120. Token 116 can be generated (either by security apparatus 120 or security service 312) and provided to the domain manager 406.

The domain manager 406 can share the token 116 with applications that are within the operating system domain 404 managed by the domain manager 406 (e.g., application 104A). Domain manager 406 can share the token 116, for example, using a file system that is allocated to the operating system domain 404. Applications outside of the operating system domain 404 that do not have access to the file system allocated to the operating system domain 404 are not able to receive the token 116 and thus could not use the token 116 to access security apparatus 120 without providing a valid security string.

In the example illustrated in FIG. 4, security service 312 establishes a shared security session 414 between the security apparatus 120 and the domain manager 406 and applications that share the token 116. Thus a security string can be entered one time for the shared security session 414 and the security apparatus 120 can be unlocked for use by applications that use the shared security session 414 (e.g., applications within an operating system domain associated with the shared security session 414). Applications that share the token can thus refrain from issuing a prompt for a security string and receiving a response from the user. Applications that do not have the token 116 can establish their own sessions with security service 312 by providing a valid security string.

As an example, operating system domain 404 can be a work domain that includes productivity applications such as an email client for a corporate email server, a VPN service to access a corporate network, a secure voice service, etc. A work domain may also include file systems and data (contacts, emails, etc.) that are commonly accessed by a user as part of their employment activities. A work domain can be contrasted with a personal domain, which may have entertainment applications (video streaming, media players, games etc.) that are not typically part of employment activities. A domain manager 406 for a work domain may prompt for and obtain a security string from the user and utilize the security string to open the shared security session 414 with the security service 312. After obtaining the token 116, the domain manager 406 for the work domain can share the token 116 with other applications that are part of the work domain. In this example, the domain manager 406 would not share the token with applications that are not part of the work domain. Thus the domain manager 406 can share the token 116 with the VPN service, email client, secure voice service etc. that are part of the work domain. Because the applications in the work domain would have the token 116, a user of those applications would not receive a separate prompt for the security string as long as the token is valid. However, personal applications, such as a personal email client, may be required to prompt for a security string and provide the security string in order to utilize the security apparatus 120.

Figure 5:
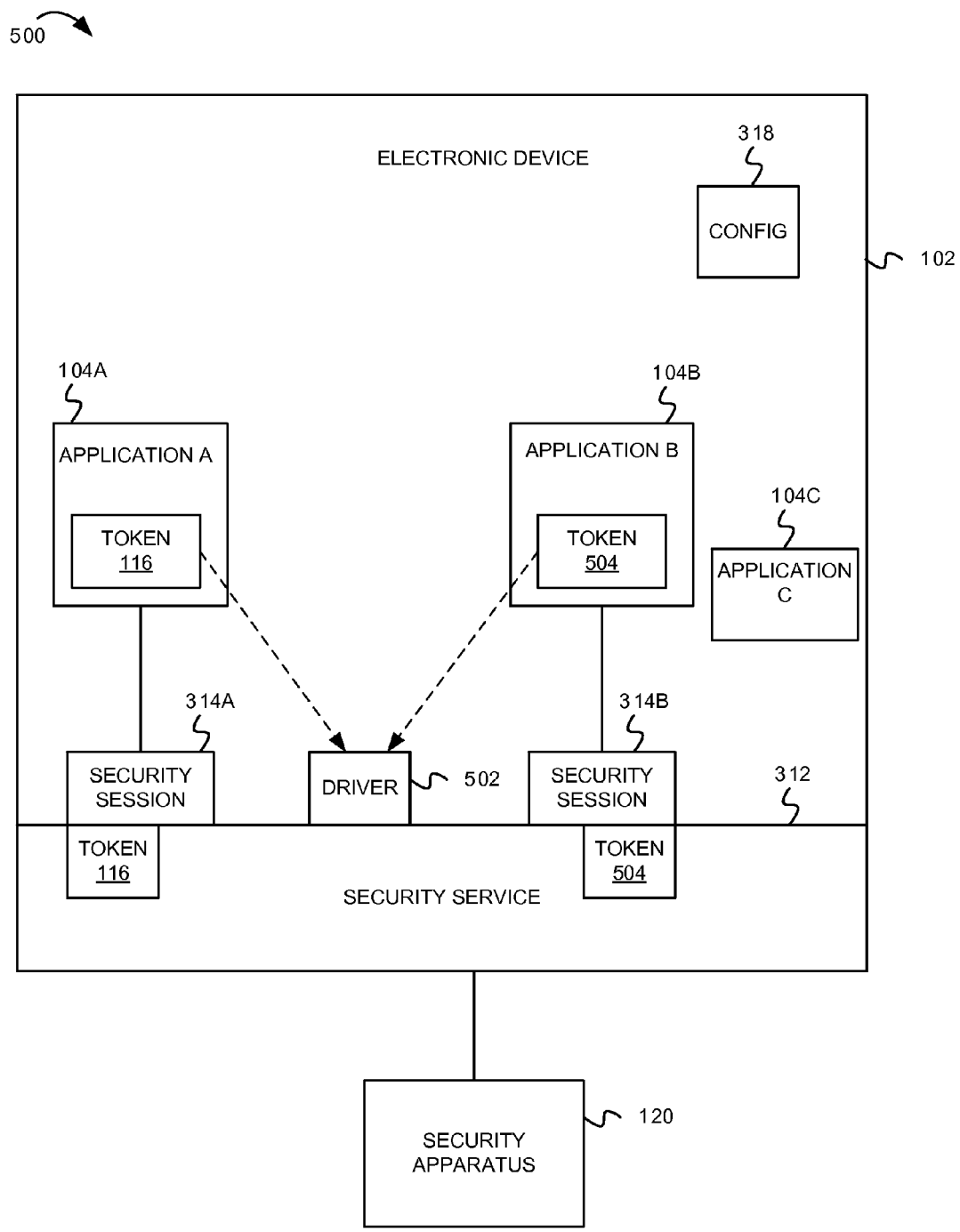
FIG. 5 is a block diagram illustrating a system for sharing a security apparatus between applications using a driver according to embodiments of this disclosure.

FIG. 5 is a block diagram illustrating a system for sharing a security apparatus between applications using a driver according to embodiments of this disclosure. In addition to the aspects of system 100 and system 300 described above, system 500 includes a driver 502. Driver 502 can be a process separate from applications 104 that can be configured to offload functionality that is common to the applications 104. As an example, driver 502 can be configured to translate cryptographic requests such as signing, encryption and decryption requests into commands and application protocol data units (APDUs) that are specific to the type of security apparatus 120 in use. Applications 104 can be designed to use software abstractions of the cryptographic operations common to different types of security apparatus, with the driver 502 providing translations from the abstracted operations to operations and APDUs that are specific to the particular type of security apparatus 120 in use.

In the example illustrated in FIG. 5, applications 104A and 104B have each established a security session (314A and 314B respectively) with security service 312 and have received a token associated with the sessions. A token 116 is associated with security session 314A and provided to application 104A. A token 504 is associated with security session 314B and provided to application 104B. When an application issues a request to utilize the security apparatus 120, the requesting application provides its token to the driver 502 along with the requested operation. For example, when the application 104A issues a request to utilize security apparatus 120, the application 104A passes the token 116 to the driver 502. Driver 502 performs translations of the request, if necessary, and passes the request to the security service 312. In addition, the driver 502 passes the token 116 to the security service 312 to indicate that the request is from a source application that is allowed to utilize the security apparatus 120. Similarly, when the application 104B issues a request to utilize the security apparatus 120, the application 104B passes the token 504 to the driver 502. Driver 502 can then use the token 504 as an indicator to the security service 312 that requests issued by the driver 502 on behalf of the application 104B are from a source that is allowed to use the security apparatus 120. Passing tokens to the driver 502 can allow the driver 502 to refrain from issuing a prompt for a security string when performing operations on behalf of requesting applications.

Figure 6:
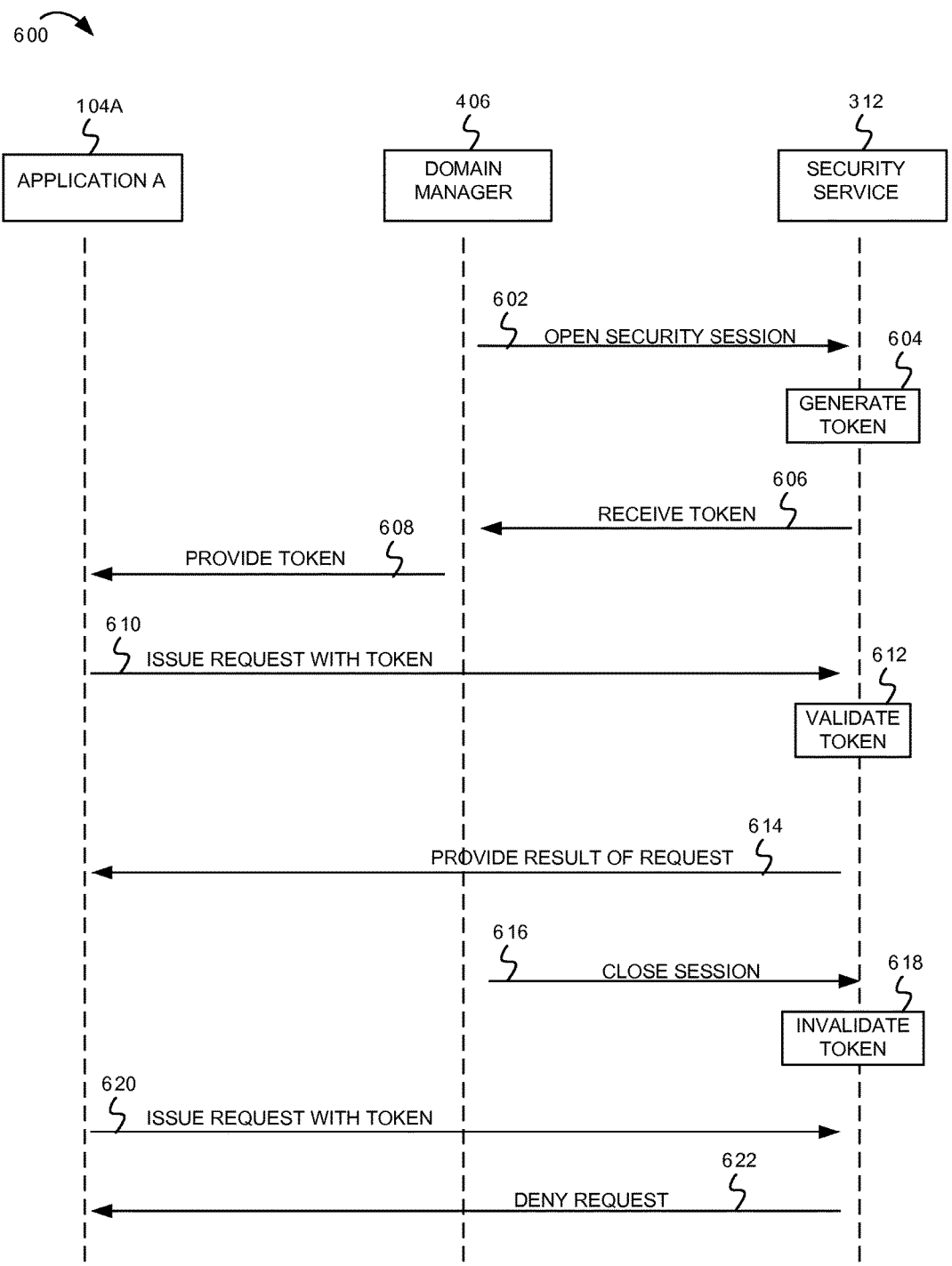
FIG. 6 is a sequence diagram of example operations for sharing a security apparatus according to embodiments of this disclosure.

FIG. 6 is a sequence diagram 600 of example operations for sharing a security device according to embodiments. The operations begin at operation 602 with the domain manager 406 opening a security session with security service 312. The security session may be opened after domain manager 406 prompts a user to enter a security string and receives the security string from the user. The security string may be passed to the security service 312 as part of the request to open the security session. The security service can provide the security string to the security apparatus 120 (FIG. 1).

At operation 604, if the security apparatus 120 determines that the security string is valid, a token is generated by the security service 312. Alternatively, the security apparatus 120 can generate the token. The token may be given an expiration date and time.

At operation 606, the domain manager 406 receives the token from the security service 312.

At operation 608, the domain manager 406 provides the token to the application 104A and other applications in the domain managed by domain manager 406. The domain manager 406 may consult configuration data to determine if the token is to be shared with a particular application. As described above, the token may be shared using a file system, shared memory, interprocess communication facilities, or other mechanism for sharing information between applications.

At operation 610, the application issues a request for a security operation to be performed by the security apparatus 120. The request is sent to the security service 312 that is an interface between the security apparatus 120 and the application 104A.

At operation 612, the token is validated by the security service 312. In some embodiments, the token is validated by the security service without the use of security apparatus 120. In alternative embodiments, the token may be sent by security service 312 to the security apparatus 120, which validates the token and returns the results of the validation to the security service 312. A token may be considered invalid if the session established when the token was generated is closed, the token has expired, a power reset has occurred on either or both of the electronic device 102 and the security apparatus 120, or the security apparatus has been removed from the electronic device (e.g., a smart card was removed from a smart card reader coupled to electronic device 102).

If the token is valid, the request issued by application 104A can be forwarded by security service 312 to security apparatus 120 for processing.

At operation 614, the results of the request can be provided to application 104A. The results of the requested operation may be forwarded from security apparatus 120 by security service 312.

At operation 616, the domain manager 406 issues a request to close the security session opened at operation 602.

At operation 618, the security service 312 invalidates the token. In some embodiments, the security service 312 may issue a request to the security apparatus 120 to invalidate the token.

At operation 620, the application issues a second request to the security service 312 for a security operation to be performed by security apparatus 120.

At operation 622, the request is denied by the security service because the token provided by the application 104A is no longer valid.

The example sequence of operations described above are but one possible example of many possible sequences. Many other sequences are possible, with different operations and different ordering of operations. The embodiments are not limited to any particular ordering of operations.

As will be appreciated by one skilled in the art, aspects of the present disclosure may be embodied as a system, method, or computer program product. Accordingly, aspects of the present disclosure may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more non-transitory computer readable medium(s) may be utilized. Non-transitory computer-readable media comprise all computer-readable media, with the sole exception being a transitory, propagating signal. The non-transitory computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 7:
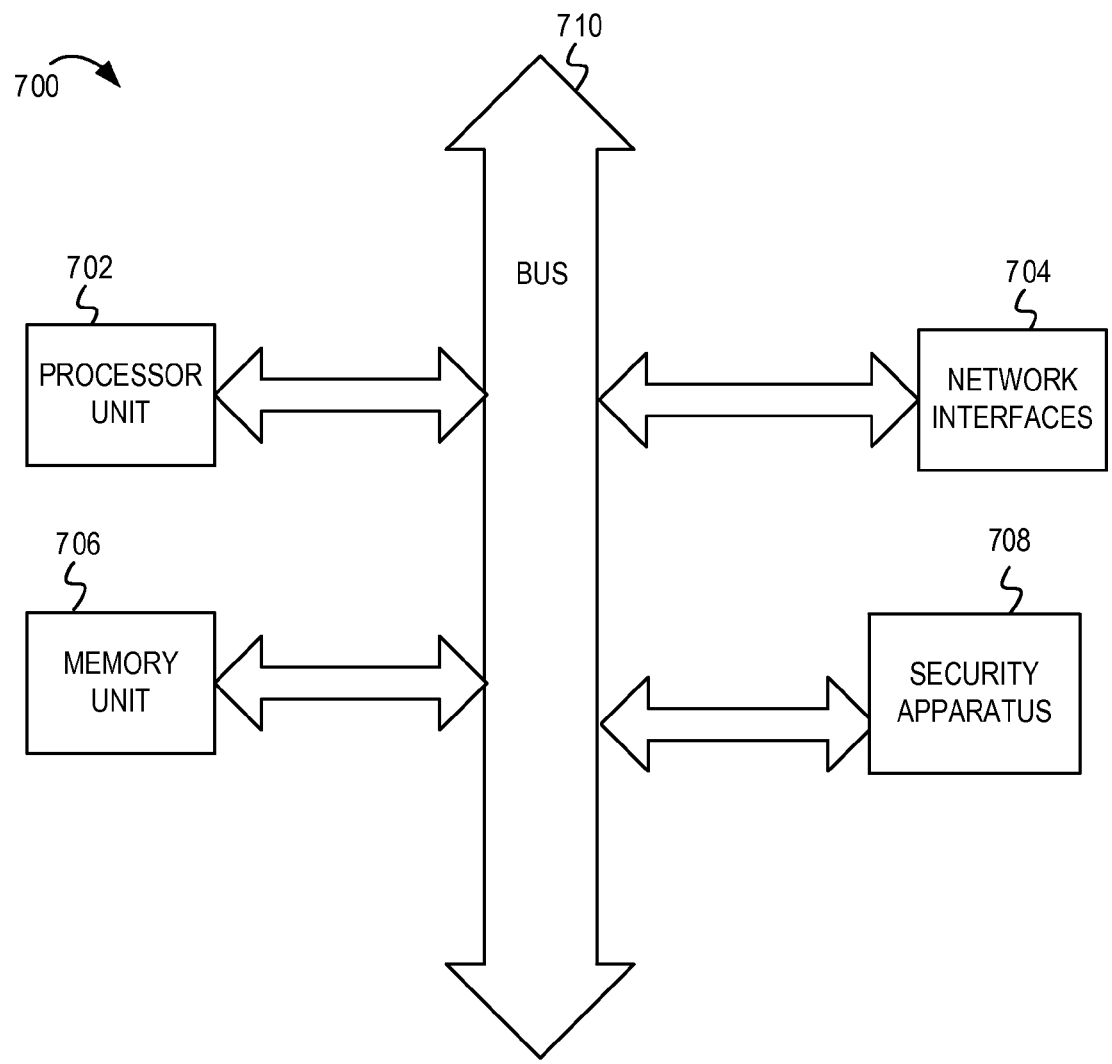
FIG. 7 is a block diagram illustrating an example electronic device according to embodiments of this disclosure.

FIG. 7 is an example block diagram of one embodiment of an electronic device 700 capable of implementing various embodiments in accordance with this disclosure. The electronic device 700 includes a processor unit 702 (possibly including multiple processors, multiple cores, multiple nodes, and/or implementing multi-threading, etc.). The electronic device 700 includes a memory unit 706. The memory unit 706 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. Those skilled in the art will appreciate that the operating system, specific device applications (e.g. illustrated as applications 104, security service 312 and domain manager 406 in FIG. 4), or parts thereof, may be temporarily loaded into a volatile store such as memory unit 706. The electronic device 700 also includes a bus 710 (e.g., PCI, ISA, PCI-Express, HyperTransport®, InfiniBand®, NuBus, AHB, AXI, etc.), and network interfaces 704 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 700 may include a security apparatus 708 or a security apparatus interface (not shown). In some embodiments, electronic device 700 may send and receive communication signals over a network after network registration or activation procedures have been completed. Network access is generally associated with a subscriber or user of an electronic device 700. To identify a subscriber, electronic device 700 may require a Subscriber Identity Module or "SIM" card (not shown) to be inserted in a SIM interface in order to communicate with a network. SIM is one type of a conventional security apparatus (often referred to as a "smart card") used to identify a subscriber of electronic device 700 and to personalize the electronic device 700, among other things.

Any one of these functionalities may be partially (or entirely) implemented in hardware and/or on the processor unit 702. For example, the functionality may be implemented with an application specific integrated circuit, in logic implemented in the processor unit 702, in a co-processor on a peripheral device or card, etc. Further, realizations may include fewer or additional components not illustrated in FIG. 7 (e.g., video cards, audio cards, additional network interfaces, peripheral devices, etc.). The processor unit 702, the memory unit 706, and the network interfaces 704 are coupled to the bus 710. Although illustrated as being coupled to the bus 710, the memory unit 706 may be coupled to the processor unit 702.

While the embodiments are described with reference to various implementations and exploitations, it will be understood that these embodiments are illustrative and that the scope of the present subject matter is not limited to them. In general, techniques for sharing a security apparatus between applications on an electronic device as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the present subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the present subject matter.

What is claimed is:

1. A method comprising:
   establishing, by a first application executing on an electronic device, a session with a security apparatus physically coupled to the electronic device upon receiving a valid security string to unlock the security apparatus, wherein the security apparatus comprises a smart card;
   receiving, by the first application, a token in response to unlocking the security apparatus, the token enabling the first application to utilize the security apparatus;
   providing, by the first application, the token to a second application executing on the electronic device using a file system on the electronic device in response to identifying the second application on a whitelist indicating that the first application is allowed to share the token with the second application, wherein the token authenticates the second application with the security apparatus, wherein the token is shared with a plurality of applications on the whitelist through the file system on the electronic device, and wherein the file system is accessible to the applications on the whitelist that are allowed to share the token; and
   invalidating the token in response to locking the security apparatus, wherein the security apparatus is locked at least upon a power reset of the electronic device.

2. The method of claim 1, wherein the first application and the second application are associated with an operating system domain of the electronic device, the electronic device comprising a mobile communications device.

3. The method of claim 1, further comprising:
   issuing, by the second application, a request for a security operation to be performed on the security apparatus, the request including the token.

4. The method of claim 1, further comprising:
   receiving a request to close the session; and
     locking the security apparatus in response to closing the session.

5. The method of claim 4, further comprising:
   establishing, by the first application or the second application, a new session with the smart card upon receiving the valid security string to unlock the smart card; and
   generating a new token by a security service executing on the electronic device, wherein the new token is generated in response to the smart card validating the security string.

6. The method of claim 1, further comprising:
   receiving, by the first application, the security string responsive to the first application prompting a user of the electronic device to input the security string; and
   providing the security string to the security apparatus.

7. The method of claim 6, wherein the second application uses the token instead of the security string to obtain access to the security apparatus while the security apparatus is unlocked, and wherein the security apparatus is locked when the token has expired or upon the power reset of the electronic device.

8. The method of claim 1, wherein the electronic device receives the whitelist from an administrator of a corporate network.

9. A non-transitory machine readable storage medium having stored thereon executable instructions for causing one or more processors to perform operations comprising:
   establishing, by a first application executing on an electronic device, a session with a security apparatus physically coupled to the electronic device upon receiving a valid security string to unlock the security apparatus, wherein the security apparatus comprises a smart card;
   receiving, by the first application, a token in response to unlocking the security apparatus, the token enabling the first application to utilize security apparatus;
   providing, by the first application, the token to a second application executing on the electronic device using a file system on the electronic device in response to identifying the second application on a whitelist indicating that the first application is allowed to share the token with the second application, wherein the token authenticates the second application with the security apparatus, wherein the token is shared with a plurality of applications on the whitelist through the file system on the electronic device, and wherein the file system is accessible to the applications on the whitelist that are allowed to share the token; and
   invalidating the token in response to locking the security apparatus, wherein the security apparatus is locked at least upon a power reset of the electronic device.

10. The non-transitory machine readable storage medium of claim 9, wherein the first application and the second application are associated with an operating system domain of the electronic device, the electronic device comprising a mobile communications device.

11. The non-transitory machine readable storage medium of claim 9, wherein the operations further comprise:
    issuing, by the second application, a request for a security operation to be performed on the security apparatus, the request including the token.

12. The non-transitory machine readable storage medium of claim 11, wherein the operations further comprise receiving a response to the security operation from the security apparatus in response to validating the token.

13. The non-transitory machine readable storage medium of claim 9, wherein the operations further comprise:
    receiving a request to close the session; and
    locking the security apparatus in response to closing the session.

14. The non-transitory machine readable storage medium of claim 13, wherein the operations further comprise:
    establishing, by the first application or the second application, a new session with the smart card upon receiving the valid security string to unlock the smart card; and generating a new token by a security service executing on the electronic device, wherein the new token is generated in response to the smart card validating the security string.

15. The non-transitory machine readable storage medium of claim 9, wherein the operations further comprise:
receiving, by the first application, the security string responsive to the first application prompting a user of the electronic device to input the security string; and
providing the security string to the security apparatus.

16. An apparatus comprising:
one or more processors; and
a non-transitory machine readable storage medium communicably coupled to the one or more processors, the non-transitory machine readable storage medium configured to store instructions, that when executed by the one or more processors cause the apparatus to:
establish, by a first application, a session with a security apparatus upon receiving a valid security string to unlock the security apparatus, wherein the security apparatus comprises a smart card physically coupled to the electronic device;
receive, by the first application, a token in response to unlocking the security apparatus, the token enabling the first application to utilize the security apparatus;
provide, by the first application, the token to a second application using a file system on the apparatus in response to identifying the second application on a whitelist indicating that the first application is allowed to share the token with the second application, wherein the token authenticates the second application with the security apparatus, wherein the token is shared with a plurality of applications on the whitelist through the file system on the apparatus, and wherein the file system is accessible to the applications on the whitelist that are allowed to share the token; and
invalidate the token in response to locking the security apparatus, wherein the security apparatus is locked at least upon a power reset of the electronic device.

17. The apparatus of claim 16, wherein the first application and the second application are associated with an operating system domain of the apparatus, the apparatus comprising a mobile communications device.

18. The apparatus of claim 17, wherein the first application comprises a domain manager for the operating system domain.

19. The apparatus of claim 16, wherein the session is shared by the first application and the second application.

20. The apparatus of claim 16, wherein the instructions further cause the apparatus to:
receive, by the first application, the security string responsive to the first application prompting a user of the apparatus to input the security string; and
receive, by the first application, the token from a security service, wherein the token is generated in response to the security apparatus validating the security string.

21. The apparatus of claim 20, wherein the security string comprises a Personal Identification Number (PIN), and wherein the token comprises a 256 bit key generated by a secure pseudo random number generator (PRNG).

* * * * *